(12) United States Patent
Heilman et al.

(10) Patent No.: US 6,586,646 B1
(45) Date of Patent: Jul. 1, 2003

(54) VINYLIDENE-CONTAINING POLYMERS AND USES THEREOF

(75) Inventors: William J. Heilman, Houston, TX (US); I-Ching Chiu, Houston, TX (US); Wei Song, Houston, TX (US); James C. W. Chien, Amhurst, MA (US)

(73) Assignee: Pennzoil-Quaker State Company, Houston, TX (US)

( * ) Notice: Subject to any disclaimer, the term of this patent is extended or adjusted under 35 U.S.C. 154(b) by 0 days.

(21) Appl. No.: 09/448,707

(22) Filed: Nov. 24, 1999

Related U.S. Application Data (63) Continuation-in-part of application No. 08/880,151, filed on Jun. 20, 1997, now Pat. No. 6,124,513.

(30) Foreign Application Priority Data

Jun. 22, 1998 (WO) .............................. PCT/US98/12621

(51) Int. Cl.$^7$ ................................................. C07C 9/00
(52) U.S. Cl. .............................. 585/12; 585/10; 585/18
(58) Field of Search ............................... 585/12, 10, 18

(56) References Cited

U.S. PATENT DOCUMENTS

| | | |
|---|---|---|
| 3,345,426 A | 10/1967 | Langer |
| 3,437,464 A | 4/1969 | Maloney |
| 3,442,839 A | 5/1969 | Gerhart et al. |
| 3,496,129 A | 2/1970 | Wismer |
| 3,598,552 A | 8/1971 | Cohen et al. |
| 3,600,451 A | 8/1971 | Rowe |
| 3,676,521 A | 7/1972 | Stearns et al. |
| 3,850,586 A | 11/1974 | Iwama et al. |
| 3,912,788 A | 10/1975 | Farona et al. |
| 3,923,919 A | 12/1975 | Stearns |
| 4,137,274 A | 1/1979 | Mikulicz |
| 4,231,883 A | 11/1980 | Malec |
| 4,377,720 A | 3/1983 | Langer |
| 4,404,344 A | 9/1983 | Sinn et al. |
| 4,413,156 A | 11/1983 | Watts, Jr. et al. |

(List continued on next page.)

FOREIGN PATENT DOCUMENTS

| | | |
|---|---|---|
| CA | 2000182 | 4/1990 |
| DE | 1939037 | 1/1971 |
| EP | 21634 | 1/1981 |
| EP | 035242 | 9/1981 |
| EP | 069951 | 1/1983 |

(List continued on next page.)

OTHER PUBLICATIONS

Chien et al., Polymerization of Propylene by Zirconocenium Catalysts with Different Counter–ions, *J. Polymer Sci.: Part A: Polymer Chemistry*, vol. 32, pp. 2387–2393, 1994.
EPO Search Report, Mar. 1, 2001.
Shaffer et al., Noncoordinating Anions in Carbocationic Polymerization, *J. Polymer. Sci.: Part A: Polymer Chemistry*, 35, pp. 329–344, 1997.

(List continued on next page.)

*Primary Examiner*—Jacqueline V. Howard
(74) *Attorney, Agent, or Firm*—Jenkens & Gilchrist a Professional Corporation (57) ABSTRACT

Various vinylidene-containing polymers are obtained in the presence of a single-site catalyst. For example, the polymers include ethylene/isobutene copolymer, ethylene/propylene/isobutene terpolymer, ethylene/styrene/isobutene terpolymer, ethylene/α-methyl-styrene/isobutene terpolymer, propylene/isobutene copolymer, styrene/isobutene copolymer, and α-methyl-styrene/isobutene copolymer. These polymers may be used to formulate lubricant oils.

21 Claims, 2 Drawing Sheets

U.S. PATENT DOCUMENTS

| | | |
|---|---|---|
| 4,463,201 A | 7/1984 | Schick et al. |
| 4,507,515 A | 3/1985 | Johnston et al. |
| 4,510,342 A | 4/1985 | Currie et al. |
| 4,542,199 A | 9/1985 | Kaminsky et al. |
| 4,547,202 A | 10/1985 | Miller |
| 4,621,111 A | 11/1986 | Duvdevani et al. |
| 4,658,078 A | 4/1987 | Slaugh et al. |
| 4,666,619 A | 5/1987 | Kresge et al. |
| 4,668,834 A | 5/1987 | Rim et al. |
| 4,704,491 A | 11/1987 | Tsutsui et al. |
| 4,769,510 A | 9/1988 | Kaminsky et al. |
| 4,789,714 A | 12/1988 | Cozewith et al. |
| 4,794,096 A | 12/1988 | Ewen |
| 4,804,794 A | 2/1989 | Ver Strate et al. |
| 4,855,526 A | 8/1989 | Hen |
| 4,874,820 A | 10/1989 | Cozewith et al. |
| 4,922,046 A | 5/1990 | Kinoshita et al. |
| 4,960,875 A | 10/1990 | Kinoshita et al. |
| 4,962,248 A | 10/1990 | Winter et al. |
| 4,990,709 A | 2/1991 | Wu |
| 5,043,515 A | 8/1991 | Slaugh et al. |
| 5,068,476 A | 11/1991 | Wu et al. |
| 5,087,788 A | 2/1992 | Wu |
| 5,151,204 A | 9/1992 | Struglinski |
| 5,171,919 A | 12/1992 | Watanabe et al. |
| 5,217,636 A | 6/1993 | Paboucek |
| 5,276,227 A | 1/1994 | Wu et al. |
| 5,296,515 A | 3/1994 | Johnson et al. |
| 5,321,107 A | 6/1994 | Tsutsui et al. |
| 5,324,800 A | 6/1994 | Welborn, Jr. et al. |
| 5,330,666 A | 7/1994 | Habeeb |
| 5,444,145 A | 8/1995 | Brant et al. |
| 5,446,221 A | 8/1995 | Struglinski |
| 5,451,630 A | 9/1995 | Olivier et al. |
| 5,498,809 A * | 3/1996 | Emert et al. .................. 585/12 |
| 5,543,469 A | 8/1996 | Struglinski et al. |
| 5,554,310 A * | 9/1996 | Rossi et al. .................. 585/12 |
| 5,557,023 A | 9/1996 | Somogyvari et al. |
| 5,763,556 A | 6/1998 | Shaffer et al. |
| 5,866,665 A | 2/1999 | Shaffer et al. |
| 5,883,213 A * | 3/1999 | Arai et al. .................... 585/12 |

FOREIGN PATENT DOCUMENTS

| | | |
|---|---|---|
| EP | 200351 | 11/1986 |
| EP | 332243 | 9/1989 |
| EP | 586777 A1 | 3/1994 |
| EP | 620264 | 10/1994 |
| FR | 1492025 | 7/1967 |
| GB | 1033456 | 6/1966 |
| GB | 1525599 | 9/1978 |
| SU | 732364 | 5/1980 |
| WO | WO 87/03610 | 6/1987 |
| WO | WO 9533781 | 12/1995 |
| WO | WO 9744370 | 11/1997 |
| WO | WO 9748741 | 12/1997 |
| WO | WO 98/37109 | 8/1998 |
| WO | WO 99/31176 | 6/1999 |

OTHER PUBLICATIONS

Barsan et al., The First Example of Polymerization of Isobutylene induced by a Metallocene–like Initiator, $[(\eta^5-C_5Me_5)TiMe_2[(\mu-Me)B(C_6F_5)_3]$, *J. Chem. Soc., Chem. Commun.*, pp. 1065–1066, 1995.

Barsan et al., Polymerization of Isobutylene and the Copolymerization of Isobutylene and Isoprene Initiated by the Metallocene Derivative, *Macromolecules*, 31(24), pp. 8439–8447, 1998.

Quyoum et al., $\eta^5-C_5Me_5TiMe_3B(C_6F_5)_3$; A Carbocationic Olefin Polymerization Initiator Masquerading as a Ziegler–Natts Catalyst, *J. Am. Chem. Soc.*, 116, pp. 6435–6436, 1994.

Carr et al., Zirconocenes as Initiators for Carbocationic Isobutene Homo– and Copolymerizations. *Macromolecules*, 31, pp. 2035–2040. 1998.

* cited by examiner

VINYLIDENE-CONTAINING POLYMERS AND USES THEREOF

This application is a continuation-in-part of U.S. patent application Ser. No. 08/880,151, filed Jun. 20, 1997, now U.S. Pat. No. 6,124,513, issued on Sep. 26, 2000. This application also claims priority from PCT/US98/12621 with international publication number WO 98/58972 which was filed Jun. 22, 1998, claiming priority from U.S. patent application Ser. No. 08/880,151. The disclosure of the above patent applications are incorporated by reference in its entirety. This application is also related to U.S. patent application Ser. No. 09/801,315, filed on Jun. 19, 2000, now U.S. Pat. No. 6,388,148, issued on May 14, 2002, which is a divisional of U.S. patent application Ser. No. 09/307,067, filed on May 7, 1999, now U.S. Pat. No. 6,262,324, issued on Jul. 17, 2001, which was a divisional of prior U.S. patent application Ser. No. 08/880,151, filed Jun. 20, 1997, now U.S. Pat. No. 6,124,513, issued on Sep. 26, 2000. This application is also related to U.S. patent application Ser. No. 09/596,481, filed on Jun. 19, 2000, now U.S. Pat. No. 6,417,416, which is a continuation of U.S. patent application Ser. No. 08/880,151 Jun. 20, 1997, now U.S. Pat. No. 6,124,513.

FIELD OF THE INVENTION

The invention relates to vinylidene-containing polymers and methods of making such polymers. The invention also relates to the applications of the vinylidene-containing polymers, especially in formulating lubricant oils.

BACKGROUND OF THE INVENTION

Synthetic hydrocarbons have been used as lubricants for automotive, aviation, and industrial applications. In the automotive industry, lubricant oils include engine oils, brake fluids, and lubricating greases. Engine oils for an automobile include 2-stroke oils, 4-stroke oils, and gear oils. In the aviation industry, lubricant oils include turbine oils, piston engine oils, hydraulic fluids, and lubricating greases. In industrial applications, lubricant oils are used as gas-turbine oils, gear oils, bearing and circulation oils, compressor oils, hydraulic oils, metal-working fluids, heat-transfer and insulation oils, and lubricating greases.

Polyisobutenes and poly-$\alpha$-olefins are two notable synthetic hydrocarbons which have been used as lubricant oils. Poly-$\alpha$-olefins have good flow properties at low temperatures, relatively high thermal and oxidative stability, low evaporation losses at high temperatures, high viscosity index, good friction behavior, good hydrolytical stability, and good erosion resistance. Poly-$\alpha$-olefins are not toxic and are miscible with mineral oils and esters. Consequently, poly-$\alpha$-olefins are suited for use in engine oils, compressor oils, hydraulic oils, gear oils, and greases. However, poly-$\alpha$-olefins have limited biodegradability and limited additive miscibility. Therefore, it may not be suitable for use as high-performance gear oils and fast biodegradable oils. Structurally, poly-$\alpha$-olefins often include tertiary hydrogen which is prone to oxidation. Therefore, it would be desirable to eliminate the presence of tertiary hydrogen so as to improve oxidation resistance to synthetic hydrocarbons.

Polyisobutenes are another type of synthetic hydrocarbon which have been used as lubricant oils. Polyisobutenes offer good lubrication properties and good corrosion resistance. Polyisobutenes are not toxic and are miscible with mineral oils. However, polyisobutenes have relatively low oxidation stability and relatively poor flow properties at low temperatures. They also have relatively high evaporation losses and low viscosity indices. Consequently, polyisobutenes are suitable for 2-stroke engine oils, compressor oils, metal-working lubricants, greases, and wire rope lubricants; but they are not suitable for most circulation-system lubricants. In addition, polyisobutenes are known to depolymerize at elevated temperatures, a phenomenon known as "unzipping." Generally, depolymerization occurs above 250° C. This unzipping phenomenon precludes use of polyisobutenes at elevated temperatures. Therefore, it would be desirable to avoid the unzipping of polyisobutenes, while retaining the benefits associated with polyisobutenes.

A copolymer of $\alpha$-olefin/isobutene may offer an alternative to polyisobutene and poly-$\alpha$-olefins. For example, an ethylene/isobutene copolymer would not include tertiary hydrogen. Thus, such copolymer may have improved oxidation resistance. Furthermore, the incorporation of ethylene units may prevent or alleviate the unzipping phenomenon associated with polyisobutenes. However, such copolymers have not been available because many vinylidene olefins, such as isobutene, do not copolymerize in the presence of a Ziegler-Natta catalyst. Therefore, there is an unfulfilled need to explore the possibility of making vinylidene-containing polymers for various applications.

SUMMARY OF THE INVENTION

Embodiments of the invention described herein meet the above need by providing various vinylidene-containing polymers, preferably obtained in the presence of a single-site catalyst. Methods of making and using the vinylidene-containing polymers also are provided herein. Such polymers have a wide range of applications. Properties and advantages associated with embodiments of the invention become apparent with the following description.

DESCRIPTION OF EMBODIMENTS OF THE INVENTION

Embodiments of the invention provide various $\alpha$-olefin/vinylidene polymers and vinylidene/vinylidene polymers. The polymers can be a copolymer, terpolymer, tetrapolymer, etc. The $\alpha$-olefin/vinylidene polymers are herein categorized into two groups: ethylene/vinylidene polymer and higher $\alpha$-olefin/vinylidene polymer, where "higher $\alpha$-olefin" refers to $\alpha$-olefins with 3 or more carbon atoms per molecule.

One characteristic of the ethylene/vinylidene polymer is that the polymer includes within its chain at least one diad of the vinylidene olefin. In some embodiments, the ethylene/vinylidene polymers may further include a repeating unit of ethylene within the polymeric chain. A polymer generally includes many polymerization units of one or more monomers. A polymerization unit refers to a segment or portion of a polymer chain that is repeated throughout the polymer chain. A diad refers to two adjacent monomers within a polymeric chain. Thus, a diad of vinylidene olefin ("V") refers to a unit of [-V-V-] within a polymeric chain. Examples of the ethylene/vinylidene polymer include, but are not limited to, ethylene/isobutene copolymer, ethylene/isobutene/propylene terpolymer, ethylene/isobutene/styrene terpolymer, and ethylene/isobutene/αa-methylstyrene terpolymer.

In contrast to the ethylene/vinylidene polymer, a vinylidene diad may or may not be present in the higher α-olefin/vinylidene polymer and the vinylidene/vinylidene polymer in accordance with embodiments of the invention. Examples of higher α-olefin/vinylidene polymer include, but are not limited to, propylene/isobutene copolymer, styrene/isobutene copolymer, etc. An example of the vinylidene/vinylidene polymer is isobutene/αa-methylstyrene copolymer.

Suitable vinylidene olefins are represented by the following formula:

$$R_1\text{—}CH=CR_2R_3$$

Where $R_1$ is hydrogen or a hydrocarbyl group, and $R_2$ and $R_3$ are independently chosen from an alkyl, aryl, and aralkyl group. Preferably, $R_1$ is a straight- or branched-chain saturated hydrocarbon radical with one to 12 carbon atoms. Most preferably, $R_1$ is hydrogen. $R_2$ and $R_3$ may be linear, branched, or cyclic hydrocarbyl groups with from one to 100 carbon atoms. The hydrocarbyl groups may either be substituted or unsubstituted. Optionally, $R_2$ and $R_3$ may be connected to form a cyclic structure. Thus, the term "vinylidene olefin" may include both monomers, such as isobutene, and macromers which conform the above representative structure. Although $R_1$, $R_2$, and $R_3$ are essentially hydrocarbyl groups, the inclusion of a heteroatom, such as O, S, N, P, Si, halogen, etc., is allowed where such heteroatoms are sufficiently removed from the double bond so as not to interfere with the coordination polymerization reactions. Specifically, suitable vinylidene olefins include, are not limited to, isobutene, 3-trimethylsilyl-2-methyl-1-propene, 2-methyl-1-butene, 2-methyl-1-pentene, 2-ethyl-1-pentene, 2-methyl-1-hexene, 2-methyl-1-heptene, 6-dimethyl-amino-2-methyl-1-hexene, alpha-methyl-styrene, 2, 4-dimethyl-pentene, and the like.

In addition to copolymers of ethylene and vinylidene olefin, embodiments of the invention also provide vinylidene-containing terpolymers, tetrapolymers, etc. These polymers are obtained by copolymerizing an ethylene monomer, a vinylidene olefin monomer, and one or more additional olefinic monomers which are different from ethylene and the vinylidene olefin.

With respect to suitable additional olefinic monomers, any olefin may be used. They include, but are not limited to, aliphatic olefins, cyclic olefin, and aromatic olefins. Suitable cyclic olefins capable of copolymerization include, but are not limited to, cyclopentene, norbornene, alkyl-substituted norbornenes, cyclohexene, cycloheptene, and so on. Examples of additional suitable olefins also include one or more of $C_3$ and higher α-olefins, styrene, and hydrocarbyl-substituted styrene monomers wherein the substituent is on the aromatic ring, $C_4$ and higher internal olefins, $C_4$ and higher diolefins, $C_5$ and higher cyclic olefins and diolefins, and $C_6$ and higher substituted α-olefins. Suitable $C_6$ and higher substituted α-olefins include those containing at least one Group IIIA to VIIA atom bound to a carbon atom of the substituted α-olefin. Examples include allyltrimethylsilane, 4,4,4-trifluoro-1-butene, and the like. The use of functional group-containing α-olefins is within the scope of the invention when such olefins can be incorporated in the same manner as are their α-olefin analogs. Furthermore, masked α-olefin monomers disclosed by U.S. Pat. No. 5,153,282 also may be used, and the disclosure of this patent is incorporated by reference in its entirety herein.

Preferred higher α-olefins include α-olefins having three to 30 carbons atoms, preferably three to 20 carbon atoms, but 1-olefin macromers having more than 30 carbon atoms and more can similarly be used. Generally, suitable α-olefins are represented by the following formula:

$$CH_2=CHR_4$$

where $R_4$ can be any hydrocarbyl group, such as alkyl, aryl, or aralkyl. Some specific examples of preferred α-olefins include, but are not limited to, propylene, 1-butene, 1-pentene, 1-hexene, 1-heptene, 1-octene, 1-nonene, 1-decene, 1-dodecene, 4-methyl-1-pentene, 5-methyl-1-nonene, 3-methyl-1-pentene, 3,5,5-trimethyl-1-hexene and vinylcyclohexane. Styrene and p-methylstyrene are preferred styrenic olefins.

In addition to monoolefins, diolefins or polyenes also may be copolymerized with one or more vinylidene olefins. Examples of suitable diolefins or polyenes include straight chain acyclic diolefins, branched acyclic diolefins, single ring alicyclic diolefins, multi-ring alicyclic fused and bridged ring diolefins and cycloalkenyl-substituted alkenes. Preferred examples are 1, 4-hexadiene, dicyclopentadiene, 5-ethylidene-2-norbornene, vinylcyclohexene 5-vinyl-2-norbornene, 4-ethylidene-norbornene, and 1,4-norbornadiene.

The vinylidene-containing polymers obtained in embodiments of the invention generally have one or more of the following characteristics. First, the polymers have a relatively narrower molecular weight distribution ("MWD")as indicated by $M_w/M_n$. The MWD is typically less than about 3.5, preferably less than about 2.5, and more preferably less than about 2. Second, the copolymers or terpolymers have substantially random comonomer distribution. In other words, comonomer incorporation into the polymer substantially fits the Bernoullian statistical model. Thus, the polymers have a substantially uniform comonomer composition. Third, the polymers do not include low molecular weight fractions to a significant amount. Other characteristics and properties are apparent to those skilled in the art.

The polymers in accordance with embodiments of the invention may be obtained in the presence of a single-site catalyst. Some metallocene compounds are known to be single-site catalysts. These metallocene compounds may include a metal from Group IVB and Group VIIIB of the Periodic Table of Elements. Optionally, a single-site catalyst system may include a cocatalyst, such as an aluminoxane compound. For example, U.S. Pat. No. 5,001,244, U.S. Pat. No. 5,272,236, and U.S. Pat. No. 5,278,272 disclose various single-site catalysts, and the disclosures of all of the above patents are incorporated by reference in their entirety herein. U.S. Pat. No. 5,866,665 discloses various single-site catalysts which may be used in embodiments of the invention. The description of suitable catalysts from column 6, line 22 to column 11, line 50 of U.S. Pat. No. 5,866,665 is incorporated 5 by reference herein. Other suitable single-site catalysts are disclosed in U.S. application Ser. No. 08/880, 151, and the relevant part is incorporated by reference herein.

In preferred embodiments, the single-site catalyst comprises a Group IVB transition metal complexes, a cation-generating cocatalyst, and an alkyl aluminum compound. Preferably, the Group IVB transition metal complex is represented by the formula:

where R is independently a linear or cyclic hydrocarbyl radical of 1to 20 carbon atoms; m=1, 2, 3, 4, or 5; n=1, 2, or 3; Y or X is independently a heteroatom moiety containing a radical selected from —Si(R'R")—, —N(R')—, —P(R')—, —O—, —S—, or —(R'R")— in which R' or R" is independently a hydrocarbyl radical of 1 to 20 carbon atoms; s or p is indenpendently 0 or 1; M is a Group IVB metal atom; and L is halogen or a hydrocarbyl radical of 1 to 20 carbon atoms; and z=4-n-p. It is noted that both $C_5R_m$ (which is a substituted or unsubstituted cyclopentadienyl group) and X (which is not a cyclopentadienyl group) are directly bonded to the transition metal M, whereas Y bridges either two $C_5R_m$ groups or one $C_5R_m$ group and one X group.

Preferably, the cocatalyst is a strong Lewis acid having the formula: $B(C_6F_5)_3$ or $(C_6H_5)_3C^+B^-(C_6F_5)_4$, and the alkyl aluminum compound is methylaluminoxane or trialkyl aluminum.

The polymers obtained in accordance with embodiments of the invention may be cracked, hydrogenated, or hydroisomerized. These processes are described in the copending U.S. patent application Ser. No. 08/880,151, and the pertinent part of the disclosure relating to these processes is incorporated by reference herein. The polymer products from cracking, hydrogenation, or hydroisomerization may be used as a component for lubricant oils.

The following examples illustrate embodiments of the invention and do not limit the invention as otherwise described herein. It should be emphasized that any numerical values disclosed herein are approximate and should not be construed as being absolute.

General Experimental Procedure

All gaseous monomers were purified by running them through a Matheson gas purifier, Model 6406-A. A 250 ml pressure reaction bottle with a magnetic stir bar was thoroughly purged with argon and was charged with 50 ml of dried toluene (distilled over potassium). Olefin monomers were premixed in a 7 liter cylinder at a desired ratio and heated to about 70° C. overnight. The monomer mixture was fed into the reaction bottle at a certain temperature under a pressure of about 10 or about 20 psig. Triisobutylaluminum (TIBA) in toluene solution was then injected into the bottle with a syringe followed by a metallocene catalyst in a toluene solution. Triphenylcarbenium tetrakis (pentafluorophenyl)borate $(Ph_3CB(C_6F_5)_4)$ in toluene solution was then added as cocatalyst. TIBA scavenges moisture in the polymerization and alkylates metallocene precursors. An approximately 1:1 molar ratio of metallocene to cocatalyst was used. Polymerization of ethylene and isobutene was initiated upon injection of the cocatalyst solution. Through the reaction run, the temperature was maintained by a constant temperature bath with a circulator. $H_2$ was used to control the molecular weight of the copolymer. The excess monomers and hydrogen were continuously vented at a rate of about 10~20 ml/min to maintain a constant gas concentration in the reaction bottle. After one hour, the polymerization was quenched by injecting 10 ml of 2% acidic methanol into the bottle. The resulting solution was stirred for an extra hour. Then it was washed three times with 200 ml of deionized water in a 500 ml separatory funnel. The organic layer was filtered through celite to get a clear solution. Toluene was subsequently removed on a rota-evaporator. The liquid copolymer product was further dried in a vacuum oven at about 75° C. overnight before being weighed and analyzed by nuclear magnetic resonance ("NMR") and gel permeation chromatography ("GPC"). Whenever isobutene was copolymerized with a liquid monomer, it was preferred that the monomers be premixed before any catalyst solution was injected.

Weight average molecular weight ($M_w$) and number average molecular weight ($M_n$) were measured by Gel Permeation Chromatography using a Waters 150CV GPC spectrometer equipped with a differential refractive index detector and calibrated with polystyrene standards. Three Shodex KF-806M and one Shodex KF-801 columns were connected in series for $M_w$ between 3,000,000 to 1,000.

$^{13}C$ NMR spectra of polymer samples were run in either $CDCl_3$ at ambient temperature using a field strength about 50 MHZ or in a mixture of trichlorobenzene/benzene-$d_6$ at about 80° C. using a field strength of about 500 MHZ. The isobutene content, i.e., IB percentage, in an ethylene/isobutene copolymer was calculated with the following formula:

$$IB\% = 100 \times 2A/(2B+A)$$

where A is integration of the methyl resonance peak and B is integration of the methylene resonance peak. To help identify NMR peaks, software was used to simulate $^{13}C$ NMR chemical shifts of ethylene-isobutene copolymers. The software used was ACD/ChemSketch software, Version 3.50/09 April 1998, by Advanced Development Inc. According to the simulation by this software, a chemical shift of about 51.2 ppm is attributable to the presence of -E-IB-IB-E- in the polymer chain (E represents ethylene and IB represents isobutene).

EXAMPLE 1

A 250 ml pressure reaction bottle with a magnetic stir bar was thoroughly purged with argon and was charged with about 50 ml of dried toluene (distilled over potassium). Ethylene, isobutene and hydrogen were premixed in a 7 liter cylinder at a ratio of about 8%, 82%, and 10%, respectively, and then heated at about 70° C. overnight. The gas mixture was fed into the reaction bottle at about 25° C. under a pressure of about 10 psig. Then about 1.5 ml of 0.05 M triisobutylaluminum (TIBA) in toluene solution was injected into the bottle with a syringe followed by about 1 ml of $3.75 \times 10^{-3}$ M Dow Insite® catalyst [dimethylsilyl (tetramethylcyclopentadienyl)(t-butylamido)] titanium dicholride (i.e., $[(C_5Me_4)SiMe_2N(t-Bu)]TiCl_2$) in toluene solution and finally about 1 ml of $3.75 \times 10^{-3}$ M triphenylcarbenium tetrakis(pentafluorophenyl)borate $(Ph_3CB(C_6F_5)_4)$ in toluene solution as cocatalyst. Polymerization of ethylene and isobutene was initiated upon injection of a cocatalyst solution. Throughout the reaction run, the temperature was maintained by a constant temperature bath with a circulator. The excess monomers and hydrogen were continuously vented at a rate of about 10 ml/min to maintain a constant gas concentration in the reaction bottle.

Figure 1:
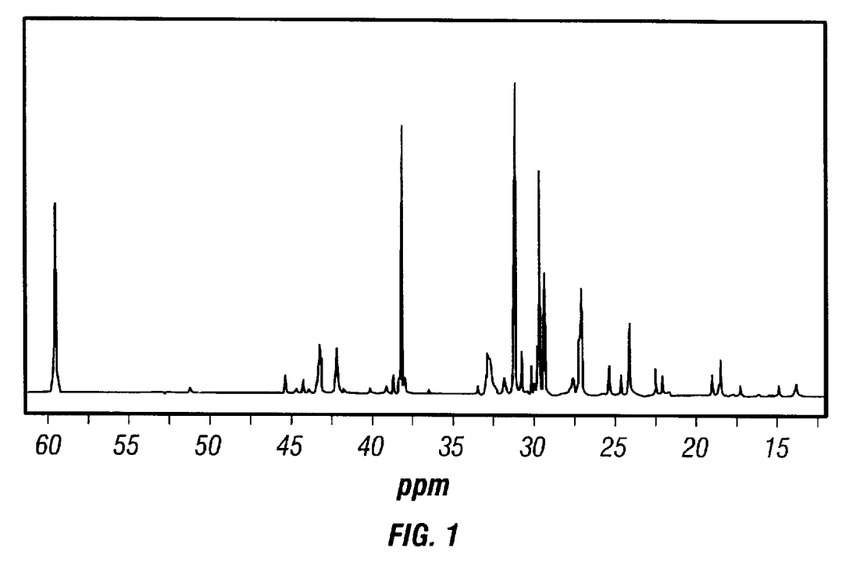
FIG. 1 is a $^{13}$C NMR spectrum of the copolymerization product of ethylene and isobutene obtained in accordance with the method described in Example 1. The chemical shift at 51.2 ppm is attributable to the presence of an isobutene diad in the resulting ethylene/isobutene copolymer.

After one hour the reaction was quenched by injecting about 10 ml of 2% acidic methanol into the bottle and the resulted solution was stirred for an extra hour. The product, along with toluene, was then washed with 3×200 ml of deionized water in a 500 ml separatory funnel. The organic layer was filtered through celite to get a clear solution. Toluene was subsequently removed into a rota-evaporator to obtain an opaque, viscous liquid. Activity of the polymerization was about $1.97 \times 10^5$ g of polymer/(mol Ti-hr). $^{13}$C-NMR analysis indicated that the product was a mixture of about 22.8% polyisobutene homopolymer and about 77.2% ethylene-isobutene copolymer. FIG. 1 is the $^{13}$C NMR spectrum of the copolymerization product of ethylene and isobutene. The ethylene/isobutene copolymer contained about 58.5% of ethylene and about 41.5% of isobutene. The isolated signal at δ 51.2 ppm in the $^{13}$C NMR of the polymerization product suggests the presence of —E-IB-IB-E- sequence in the copolymer.

EXAMPLE 2

The procedure was essentially the same as Example 1, except that a 1-liter Autoclave Engineer Pressure Reactor and different polymerization conditions were used. The reaction conditions are summarized in Table 1. A viscous liquid product was obtained. $^{13}$C NMR analysis indicated that the product was a mixture of about 23.0% polyisobutene homopolymer and about 77.0% ethylene-isobutene copolymer. The copolymer contained about 75.2% of ethylene and about 24.8% isobutene. Polyisobutene has $M_w$ of about 780 and $M_w/M_n$ of about 1.42. Ethylene-isobutene copolymer has $M_w$ of about 8,147 and $M_w/M_n$ of about 1.51. Once again, the isolated signal at δ 51.2 ppm in the $^{13}$C NMR of the polymerization product suggests the presence of —E-IB-IB-E- sequence in the copolymer.

TABLE 1

Polymerization Conditions

| Example | 1 | 2 |
|---|---|---|
| Reactor size | 250 ml | 1 L |
| Ethylene in feed, % | 8 | 10 |
| Isobutene in feed, % | 82 | 80 |
| Hydrogen in feed, % | 10 | 10 |
| Polymerization temperature, ° C. | 25 | 40 |
| Polymerization pressure, psig | 10 | 20 |
| Polymerization time, hr. | 1 | 0.5 |
| Toluene, ml | 50 | 300 |
| TIBA | 1.5 ml of 0.05 M | 2 ml of 1 M |
| Insite ® catalyst | 1 ml of $3.75 \times 10^{-3}$ M | 8 ml of 0.0375 M |
| $Ph_3CB(C_6F_5)_4$ | 1 ml of $3.75 \times 10^{-3}$ M | 8 ml of 0.0375 M |
| Activity, g of polymer/ (mol Ti-hr) | $1.97 \times 10^5$ | $3.7 \times 10^5$ |

EXAMPLE 3

Figure 2:
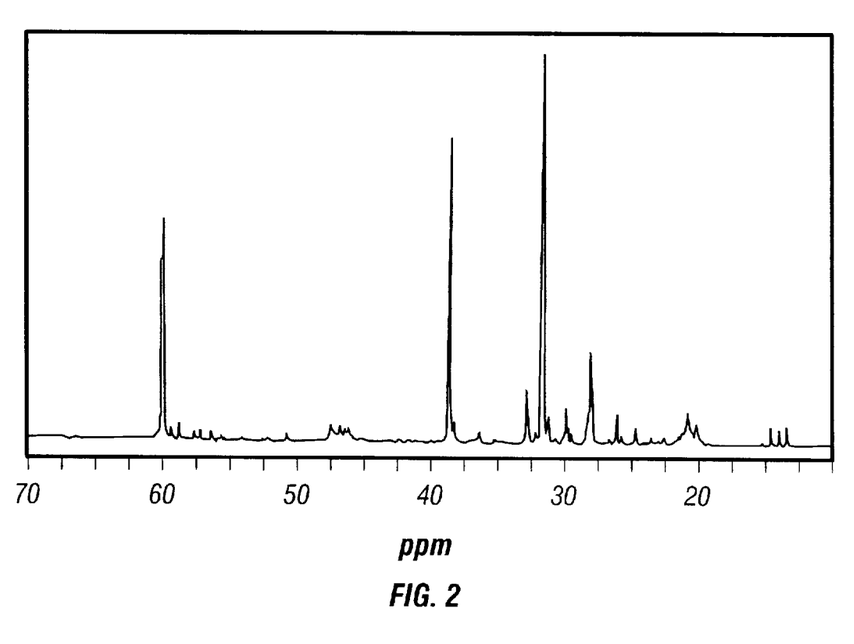
FIG. 2 is a $^{13}$C NMR spectrum of the copolymerization product of propylene and isobutene obtained by the method described in Example 3.

The procedure was essentially the same as Example 1. A propylene, isobutene and hydrogen gas mixture at a ratio of about 9%, 82%, and 9%, respectively, was fed into the reaction bottle containing about 50 ml of toluene at about 60° C. under a pressure of about 20 psig. About 2 ml of 0.05 M TIBA, 4 ml of $15 \times 10^{-3}$ M Insite® catalyst and 4 ml of $15 \times 10^{-3}$ M $Ph_3CB(C_6F_5)_4$ solutions were used to initiate polymerization. The gas phase of the reaction system was continuously vented at a rate of about 20 ml/min. After about one hour of reaction, a clear liquid was obtained with an activity of about $0.73 \times 10^5$ g of polymer/(mol Ti—hr). The liquid has $M_w$ of about 3,316 and $M_w/M_n$ of about 3.00. $^{13}$C NMR analysis of the liquid showed formation of propylene-isobutene copolymer. FIG. 2 is the $^{13}$C NMR spectrum of the copolymerization product of propylene and isobutene.

EXAMPLE 4

The procedure was essentially the same as Example 3 except a monomer gas mixture at a ratio of about 26%, 65% and 9% for propylene, isobutene and hydrogen, respectively, was fed into the reaction bottle and about 3 ml of 0.05 M TIBA was used to initiate polymerization. After about one hour of reaction, a clear liquid was obtained with an activity of about $0.53 \times 10^5$ g of polymer/(mol Ti—hr.). The liquid has $M_w$ of about 4,900 and $M_w M_n$ of about 5.77. $^{13}$C NMR analysis of the liquid showed formation of propylene-isobutene copolymer.

EXAMPLE 5

The procedure was essentially the same as Example 1. An ethylene, propylene, isobutene and hydrogen gas mixture at a ratio of about 9%, 4%, 78% and 9%, respectively, was fed into the reaction bottle containing about 50 ml of toluene at about 40° C. under a pressure of about 20 psig. About 2 ml of 0.05 M TIBA, 2 ml of $3.75 \times 10^{-3}$ M Insite ® catalyst, and 2 ml of $3.75 \times 10^{-3}$ $^M Ph_3CB(C_6F_5)_4$ solutions were used to initiate polymerization. The gas phase of the reaction system was continuously vented at a rate of about 20 ml/min. After one hour of reaction, a clear liquid was obtained with an activity of about $4.89 \times 10^5$ g of polymer/(mol Ti-hr). $^{13}$C NMR analysis of the liquid showed formation of ethylene-propylene-isobutene terpolymer.

EXAMPLE 6

The procedure was essentially the same as Example 5 except the monomer gas mixture was at a ratio of about 13.4%, 18%, 55.2% and 13.4% for ethylene, propylene, isobutene and hydrogen, respectively. After one hour of reaction, a clear liquid was obtained with an activity of about $3.47 \times 10^5$ g of polymer/(mol Ti—hr). $^{13}$C NMR analysis of the liquid showed formation of ethylene-propylene-isobutene terpolymer.

EXAMPLE 7

The procedure was similar to that in Example 1. The reaction bottle was charged with about 50 ml of dried toluene and about 10 ml of styrene. About 10 psig of a gas mixture at a ratio of about 10% and 90% for ethylene and isobutene, respectively, was fed into the bottle at about 50° C. About 3 ml of 0.05 M TIBA, 4 ml of 0.015 M Insite® catalyst, and 4 ml of 0.015 M $Ph_3CB(C_6F_5)_4$ solutions were used to initiate polymerization. The gas phase of the reaction system was continuously vented at a rate of about 10 ml/min. After about one hour of reaction, a semi-solid was obtained with an activity of about $2.42 \times 10^5$ g of polymer/ (mol Ti-hr). The product has $M_w$ of about 3,127 and $M_w/M_n$ of about 3.06. Differential Scanning Calorimetry ("DSC") study of the polymer indicated an ethylene-styrene-isobutene terpolymer was formed.

EXAMPLE 8

The procedure was similar to Example 7. About 10 psig of a gas mixture at a ratio of about 10% and 90% for ethylene and isobutene, respectively, was fed into the bottle containing about $1.04 \times 10^{-4}$ mole of$(C_5Me_5)TiCl_3$ and about 10 ml of an α-methyl-styrene at about 25° C. About 3 ml 0.05 M TIBA and 5 ml of 0.02 M $Ph_3CB(C_6F_4)_4$ solutions were used to initiate polymerization. The gas phase of the reaction system was continuously vented at a rate of about 10 ml/min. After about one hour of reaction, a solid product was obtained with an activity of about $0.24 \times 10^5$ g of polymer/(mol Ti-hr). DSC study of the polymer indicated an ethylene-α-methyl-styrene-isobutene terpolymer was formed.

EXAMPLE 9

The procedure was essentially the same as Example 8 except for $1.04 \times 10^{-4}$ mole of Insite® catalyst instead of $(C_5Me_5)TiCl_3$ was used as a catalyst for polymerization. After one hour of reaction, solid product was obtained with an activity of $0.41 \times 10^5$ g of polymer/(mol Ti-hr). DSC study of the material indicated an ethylene-α-methyl-styrene-isobutene terpolymer was formed.

EXAMPLE 10

Figure 3:
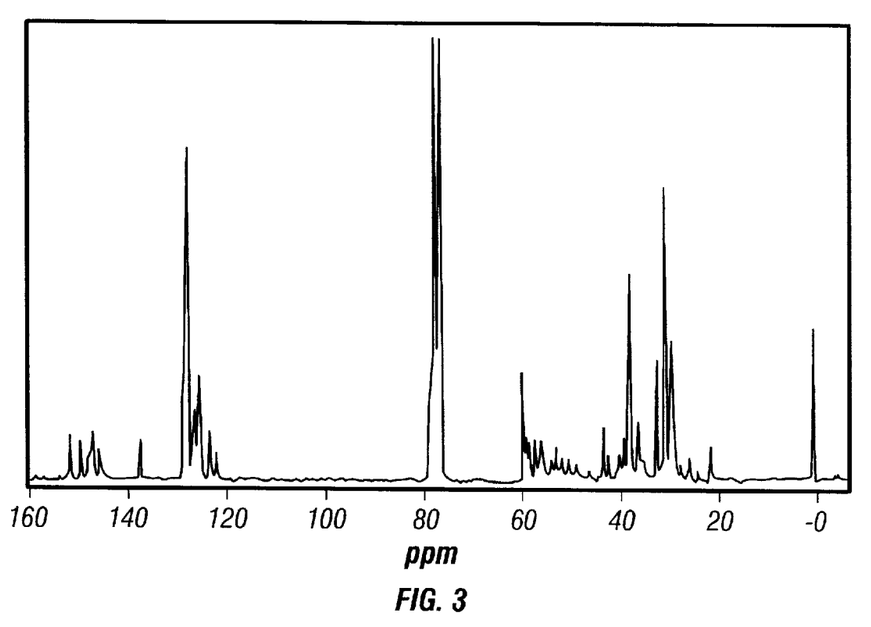
FIG. 3 is a $^{13}$C NMR spectrum of the copolymerization product of styrene and isobutene obtained by the method described in Example 10.

The procedure was similar to that in Example 1. A 250 ml pressure reaction bottle with a magnetic stir bar was thoroughly purged with argon and was charged with about 50 ml of dried toluene and 10 ml of styrene. Then about 10 psig of isobutene was fed into the bottle at about 50° C. About 3 ml of 0.05 M TIBA, 4 ml of 0.0152 M $(C_5Me_5)TiCl_3$ in toluene solution and 4 ml of 0.0152 M $Ph_3CB(C_6F_5)_4$ were used to initiate polymerization. After about one hour of reaction, a clear liquid was obtained with an activity of about $1.21 \times 10^5$ g of polymer/(mol Ti-hr). $^{13}C$ NMR analysis of the liquid showed a substantially random styrene-isobutene copolymer was formed and it contained about 67% of isobutene and about 33% of styrene. FIG. 3 is a 13C NMR spectrum of the copolymerization product of styrene and isobutene. The liquid product had $M_w$ of about 2755 and $M_w/M_n$ of about 3.62.

EXAMPLE 11

Figure 4:
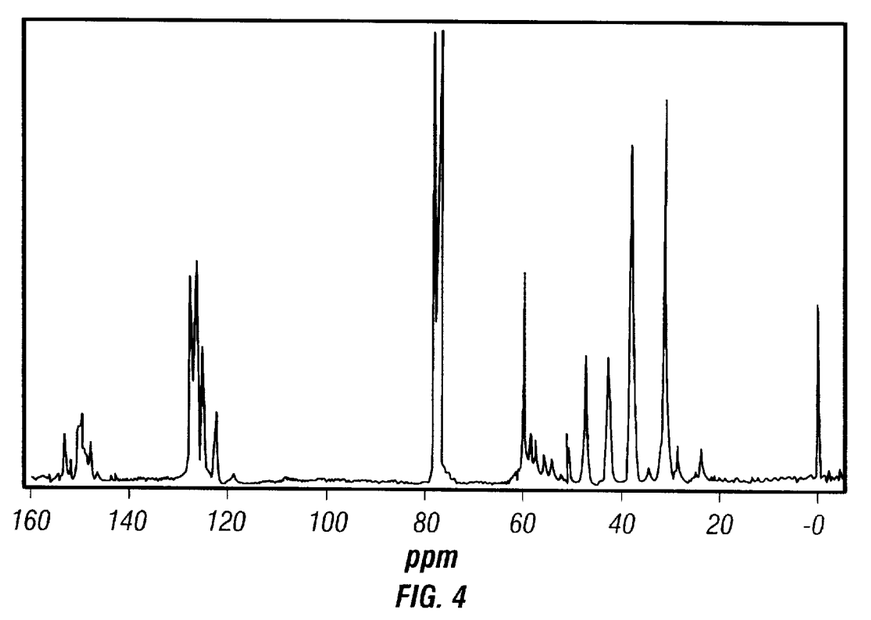
FIG. 4 is a $^{13}$C NMR spectrum of the copolymerization product of an $\alpha$-methyl-styrene and isobutene obtained by the method described in Example 11.

The procedure was similar to that in Example 10. A 250 ml pressure reaction bottle with a magnetic stir bar was thoroughly purged with argon and was charged with about $1.04 \times 10^{-4}$ mole of $(C_5Me_5)TiCl_3$ and about 10 ml of α-methyl-styrene. About 10 psig of isobutene was fed into the bottle at about 25° C. About 3 ml of 0.05 M TIBA and 5 ml of 0.02 M $Ph_3CB(C_6F_5)_4$ solutions were used to initiate polymerization. After about one hour of reaction, a clear liquid was obtained with an activity of about $0.51 \times 10^5$ g of polymer/(mol Ti-hr). $^{13}C$ NMR analysis of the liquid indicated substantially random α-methyl-styrene-isobutene copolymer was formed and it contained about 59% of isobutene and about 41% of α-methyl-styrene. FIG. 4 is a $^{13}C$ NMR spectrum of the α-methyl-styrene/isobutene copolymer. The liquid had $M_w$ of about 1,211 and $M_w/M_n$ of about 3.85.

EXAMPLE 12

This example compares the oxidation stability of a commercially-available poly-α-olefin base stock with a base oil formulated with a hydrogenated ethylene-isobutene copolymer obtained in Example 2. Commercially-available poly-α-olefins were obtained under the trade name of Mobil 1001 and is referred to as PAO 100. Two samples were made from the commercially available poly-α-olefin: the first sample included the PAO 100 as the major component and about 0.25 wt % of an antioxidant; and the second sample included the PAO 100 and about 0.50 wt % of an antioxidant. The antioxidant used was 2,6-di-t-butyl-4-methylphenol.

Two additional samples were made from hydrogenated ethylene/isobutene copolymers of Example 2. Hydrogenation of the ethylene/isobutene copolymers was carried out by the method described in Example 4 of U.S. patent application Ser. No. 08/880,151 (from which this application claims priority). The hydrogenated ethylene/isobutene copolymers were mixed with about 0.25 wt % and about 0.50 wt % of 2,6-di-t-butyl-4-methylphenol as antioxidant, respectively, to make the third and the fourth samples.

The oxidation resistance of these four samples was studied by pressurized DSC. In this method, a sample was loaded in a sample chamber filled with oxygen to about 500 psi. The sample was heated to a temperature of about 175° C. The DSC apparatus detected and recorded the induction time it took for the sample to be oxidized under such conditions. The induction time is a general indicator of the oxidation stability of the sample. The longer the induction time, the more oxidation sample generally is. Table 2 shows the average induction time for the four samples measured.

TABLE 2

| Sample Number | Composition | Average Induction Time (min) |
|---|---|---|
| 1 | PAO 100 with 0.25 wt % of antioxidant | 27.8 |
| 2 | PAO 100 with 0.50 wt % of antioxidant | 30.1 |
| 3 | Ethylene/isobutene with 0.25 wt % of antioxidant | 31.7 |
| 4 | Ethylene/isobutene with 0.50 wt % of antioxidant | 42.7 |

It is surprising that the ethylene/isobutene copolymers have substantially better oxidation resistance than PAO 100 for the same amount of antioxidant. As such, the ethylene/isobutene copolymers obtained in accordance with embodiments of the invention may be used as a component of lubricant oils.

The vinylidene-containing polymers obtained in accordance with embodiments of the invention may be used in lubricant oils in amounts from about 0.1 wt % to about 99 wt %. The lubricant oils may also contain a number of conventional additives in amounts required to provide various functions. These additives include, but are not limited to, ashless dispersants, metal or overbased metal detergent additives, zinc dihydrocarbyl dithiophosphate, anti-wear additives, antioxidants, pour depressants, rust inhibitors, fuel economy or friction reducing additives, and the like.

Suitable ashless dispersants may include, but are not limited to, polyalkenyl or borated polyalkenyl succinimide where the alkenyl group is derived from a $C_3-C_4$ olefin, especially polyisobutenyl having a number average molecular weight of about 7,090 to 5,000. Other well known dispersants include the oil soluble polyol esters of hydrocarbon substituted succinic anhydride, e.g. polyisobutenyl succinic anhydride, and the oil soluble oxazoline and lactone oxazoline dispersants derived from hydrocarbon substituted succinic anhydride and di-substituted amino alcohols. Lubricating oils typically contain about 0.5 to about 5 wt % of ashless dispersant.

Suitable metal detergent additives are known in the art and may include one or more of overbased oil-soluble calcium, magnesium and barium phenates, sulfurized phenates, and sulfonates (especially the sulfonates of $C_{16}-C_{50}$ alkyl substituted benzene or toluene sulfonic acids which have a total base number of about 80 to 300). These overbased materials may be used as the sole metal detergent additive or in combination with the same additives in the neutral form; but the overall metal detergent additive should have a basicity as represented by the foregoing total base number. Preferably they are present in amounts of from about 3 to 6 wt % with a mixture of overbased magnesium sulfurized phenate and neutral calcium sulfurized phenate (obtained from $C_9$ or $C_{12}$ alkyl phenols).

Suitable anti-wear additives are oil-soluble zinc dihydrocarbyldithiophosphates with a total of at least 5 carbon atoms and are typically used in amounts of about 1–6% by weight.

Other suitable conventional viscosity index improvers, or viscosity modifiers, are olefin polymers, such as polybutene, hydrogenated polymers and copolymers and terpolymers of styrene with isoprene and/or butadiene, polymers of alkyl acrylates or alkyl methacrylates, copolymers of alkyl methacrylates with N-vinyl pyrrolidone or dimethylaminoalkyl methacrylate, post-grafted polymers of ethylenepropylene with an active monomer such as maleic anhydride which may be further reacted with alcohol or an alkylene polyamine, styrene-maleic anhydride polymers post-reacted with alcohols and amines and the like. These are used as required to provide the viscosity range desired in the finished oil, in accordance with known formulating techniques.

Examples of suitable oxidation inhibitors are hindered phenols, such as 2,6-di-tertiary-butyl-paracresol, amines sulfurized phenols and alkyl phenothiazones. Usually, a lubricating oil may contain about 0.01 to 3 wt % of oxidation inhibitor, depending on its effectiveness.

Rust inhibitors are employed in very small proportions such as about 0.1 to 1 weight percent with suitable rust inhibitors being exemplified by $C_9$–$C_{30}$ aliphatic succinic acids or anhydrides such as dodecenyl succinc anhydride. Antifoam agents are typically polysiloxane silicone polymers present in amounts of about 0.01 to 1 wt %.

Pour depressants are used generally in amounts of from about 0.01 to about 10.0 wt %, more typically from about 0.1 to about 1 wt %, for most mineral oil basestocks of lubricating viscosity. Illustrative of pour point depressants which are normally used in lubricating oil compositions are polymers and copolymers of n-alkyl methacrylate and n-alkyl acrylates, copolymers of di-n-alkyl fumarate and vinyl acetate, alpha-olefin copolymers, alkylated naphthalenes, copolymers or terpolymers of alpha-olefins and styrene and/or alkyl styrene, styrene dialkyl maleic copolymers and the like.

The polymers obtained in accordance with embodiments of the invention are useful in numerous applications, depending upon the type of polymers and their compositions. The polymers may be in the form of liquid, semi-solid, or solid. The polymers may be elastiomeric, plastic, or plastomeric. The molecular weight of the polymers may range from about 200 to over 2,000,000. The polymer may be cracked, hydrogenated, or hydroisomerized. The polymer products from cracking, hydrogenation, or hydroisomerization may be used as a component for lubricant oils and other useful products.

In accordance with the embodiments of this invention, the vinylidene copolymers and terpolymers containing aliphatic α-olefins are useful as pressure sensitive adhesives and hot-melt adhesive. The styrene-containing product of this invention possesses the properties required for printable or platable coating. The vinylidene containing polymers with non-conjugated diolefin comonomer are useful as sealant, elastomer and viscosity improver. It is noted that a vinylidene/ethylene copolymer is substantially devoid of tertiary hydrogen and thus should be resistant to oxidation and degradation catalyzed by a transition metal. Because of the absence of reactive tertiary hydrogen, lubricant oils formulated from these polymers should have improved high temperature oxidative stability.

As demonstrated above, embodiments of the invention provide various vinylidene-containing polymers. Among them are vinylidene/α-olefin polymers and vinylidene/vinylidene polymers. These polymers may optionally include an additional olefin monomer which is different from the vinylidene olefin and the α-olefin. In the case of an ethylene/vinylidene polymer, it includes at least one vinylidenic diad. For other types of polymers, there may or may not be a diad of vinylidene olefin. When used as a component of a lubricant oil, the polymers may offer one or more of the following advantages: improved oxidation resistance, improved thermal stability, desired viscosity, lower pour point, lower cold cranking viscosity, higher fire point, and cost-effectiveness.

It is important to note that the application of the vinylidene-containing polymers is not limited only to formulating lubricant oils. The vinylidene-containing polymers also may have a variety of applications in manufacturing air care products, skin care products, hair care products, cosmetics, household products, cleaners, polishes, fabric care products, textile coatings, textile lubricants, automotive products, car cleaners and polishes, fuel additives, oil additives, candles, pharmaceuticals, suspending agents, sun care products, insecticides, gels, hydraulic fluids, transmission fluids, modifiers for polymers, biodegradable products, engine oils, and so on. Additional applications may include uses as hot-melt adhesive, printable coating, sealant, elastomer, and viscosity improver.

While the invention has been described with respect to a limited number of embodiments, modifications and variations therefrom exist. For example, a polymer that includes two or more vinylidene olefins without the presence of an α-olefin may similarly be produced using the methods described herein. Also, copolymers, terpolymers, and tetrapolymers that include vinylidene olefins only may be synthesized in a similar fashion. Although the polymers in accordance with embodiments of the invention are made in the presence of a single-site catalyst system, other catalyst systems may also be used so long as they produce the polymers with similar characteristics described herein. The appended claims are intended to cover all such variations and modifications as fall within the scope of the invention.

What is claimed is:

1. A copolymer comprising:
    polymerization units of an ethylene monomer and a vinylidene olefin monomer, wherein the polymer has a polymeric chain that includes a repeating unit of and at least one unit of;
    wherein E represents the ethylene monomer, and V represents the vinylidene olefin monomer, and wherein the polymer has a molecular weight <10,000.

2. The copolymer of claim 1, wherein the polymeric chain further includes a repeating unit of.

3. The copolymer of claim 1, wherein the vinylidene monomer is selected from the group consisting of aliphatic vinylidene olefins, cyclic vinylidene olefins, and aromatic vinylidene olefins.

4. The copolymer of claim 1, wherein the vinylidene olefin has the formula of $R_1$—CH=$CR_2R_3$, in which $R_1$ is H, alkyl, aryl, or aralkyl, and $R_2$ and $R_3$ are independently chosen from alkyl, aryl, and aralkyl.

5. The copolymer of claim 1, wherein the vinylidene olefin is selected from the group consisting of 2-methyl-1-propene, 2-methyl-1-butene, 2-methyl-1-pentene, 2-methyl-1-hexene, and α-methyl-styrene.

6. The copolymer of claim 1, wherein the polymer is a copolymer of ethylene and isobutene.

7. The copolymer of claim 1, wherein the polymer is a copolymer of ethylene and α-methylstyrene.

8. A cracked copolymer obtained by cracking the copolymer of claim 1.

9. A hydrogenated copolymer obtained by hydrogenating the copolymer of claim 1.

10. A hydrogenated cracked copolymer opined by hydrogenating the cracked copolymer of claim 8.

11. A hydroisomerized copolymer obtained by hydroisomerizing the copolymer of claim 1.

12. A method of making a lubricant oil, comprising:

mixing a copolymer of ethylene and a vinylidene olefin with an additive, wherein the copolymer includes a chain segment that has at least one diad derived from the vinylidene olefin, and wherein the copolymer has a molecular weight <10,000.

13. A lubricant comprising:

a copolymer comprising polymerization units of an ethylene monomer and a vinylidene olefin monomer, wherein the polymer has a polymeric chain that includes a repeating unit of and at least one unit of;

wherein E represents the ethylene monomer, and V represents the vinylidene olefin monomer, and wherein the polymer has a molecular weight <10,000.

14. The lubricant of claim 13, wherein the vinylidene olefin has the formula of $R_1$—CH=$CR_2R_3$, in which $R_1$ is H, alkyl, aryl, or aralkyl, and $R_2$ and $R_3$ are independently chosen from alkyl, aryl, and aralkyl.

15. The lubricant of claim 13, wherein the vinylidene olefin is selected from the group consisting of 2-methyl-1-propene, 2-methyl-1-butene, 2-methyl-1-pentene, 2-methyl-1-hexene, and α-methyl-styrene.

16. The lubricant of claim 13, wherein the copolymer comprises ethylene and isobutene.

17. The lubricant of claim 13, wherein the copolymer comprises ethylene and α-methylstyrene.

18. The lubricant of claim 13, wherein the copolymer is cracked.

19. The lubricant of claim 13, wherein the copolymer is hydrogenated.

20. The lubricant of claim 13, herein the cracked copolymer is hydrogenated.

21. The lubricant of claim 13, wherein the copolymer is hydroisomerized.

* * * * *

UNITED STATES PATENT AND TRADEMARK OFFICE
CERTIFICATE OF CORRECTION

PATENT NO. : 6,586,646 B1
DATED : July 1, 2003
INVENTOR(S) : William J. Heilman et al.

It is certified that error appears in the above-identified patent and that said Letters Patent is hereby corrected as shown below:

Column 3,
Line 10, delete "ethylene/isobutene/αa-methylstyrene" and insert -- ethylene/isobutene/α-methylstyrene -- therefor.
Line 19, delete "isobutene/αa" and insert -- isobutene/α -- therefor.

Column 5,
Line 10, delete "1to 20" and insert -- 1 to 20 -- therefor.
Line 13, delete "—(R'R")—" and insert -- —C(R'R")— -- therefor.
Line 15, delete "indenpendently" and insert -- independently -- therefor.

Column 6,
Line 20, delete "CDCl$_3$" and insert -- CDCl$_3$ -- therefor.
Line 54, delete "of3.75x10$^{-3}$" and insert -- of 3.75x10$^{-3}$ -- therefor.

Column 7,
Line 51, delete "and $^9$%" and insert -- and 9% -- therefor.

Column 8,
Line 18, delete "$^M$Ph$_3$CB(C$_6$F$_5$)$_4$" and insert -- M Ph$_3$CB(C$_6$F$_5$)$_4$ -- therefor.

Column 9,
Line 17, delete "of0.0152" and insert -- of 0.0152 -- therefor.
Line 24, delete "13C NMR" and insert -- $^{13}$C NMR -- therefor.
Line 26, delete "2755and" and insert -- 2,755 and -- therefor.

Column 12,
Line 44, delete "unit of and" and insert -- unit of —E—V— and -- therefor.
Line 45, delete "unit of;" and insert -- unit of —V—V—; -- therefor.
Line 51, delete "unit of." and insert -- unit of —E—. -- therefor.

Column 13,
Line 5, delete "opined" and insert -- obtained -- therefor.
Line 20, delete "unit of and at least one unit of;" and insert -- unit of —E—V— and at least one unit of —V—V—; -- therefor.

UNITED STATES PATENT AND TRADEMARK OFFICE
CERTIFICATE OF CORRECTION

PATENT NO. : 6,586,646 B1
DATED : July 1, 2003
INVENTOR(S) : William J. Heilman et al.

It is certified that error appears in the above-identified patent and that said Letters Patent is hereby corrected as shown below:

Column 14,
Line 19, delete "herein" and insert -- wherein -- therefor.

Signed and Sealed this

Twenty-seventh Day of January, 2004

JON W. DUDAS
*Acting Director of the United States Patent and Trademark Office*